(12) United States Patent
Park et al.

(10) Patent No.: US 9,407,946 B2
(45) Date of Patent: Aug. 2, 2016

(54) APPARATUS AND METHOD FOR PROVIDING AN APPLICATION SERVICE IN A BROADCAST SYSTEM

(75) Inventors: Kyung-Mo Park, Seoul (KR); Sung-Oh Hwang, Yongin-si (KR); Jae-Yeon Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/980,484

(22) PCT Filed: Jan. 19, 2012

(86) PCT No.: PCT/KR2012/000512
§ 371 (c)(1),
(2), (4) Date: Jul. 18, 2013

(87) PCT Pub. No.: WO2012/099428
PCT Pub. Date: Jul. 26, 2012

(65) Prior Publication Data
US 2013/0305305 A1   Nov. 14, 2013

(30) Foreign Application Priority Data
Jan. 19, 2011   (KR) .................. 10-2011-0005645

(51) Int. Cl.
*H04N 7/173* (2011.01)
*H04N 21/258* (2011.01)
(Continued)

(52) U.S. Cl.
CPC ....... *H04N 21/25866* (2013.01); *H04N 21/631* (2013.01); *H04N 21/6405* (2013.01)

(58) Field of Classification Search
CPC .................. H04N 21/2362; H04N 21/23614; H04N 21/63; H04N 21/633; H04N 21/6332; H04N 21/84
USPC ............. 725/105, 109, 110, 114, 116, 37, 38; 72/105, 109, 110, 114, 116, 37, 38
See application file for complete search history.

(56) References Cited

U.S. PATENT DOCUMENTS 6,314,111 B1 * 11/2001 Nandikonda ..... H04L 29/12066
                                                                 348/E5.005
7,028,327 B1 *  4/2006 Dougherty et al. ............. 725/93
8,359,626 B1 *  1/2013 Rey ..................... H04N 21/235
                                                                  725/132

(Continued)

FOREIGN PATENT DOCUMENTS

JP          2002-344400 A        11/2002
KR    10-2006-0125264 A         12/2006
(Continued)

*Primary Examiner* — James R Sheleheda
(74) *Attorney, Agent, or Firm* — Jefferson IP Law, LLP (57) ABSTRACT

An apparatus and a method for driving an application, contained in a hybrid multimedia service, in a broadcast system that provides a user equipment with the hybrid multimedia service based on a hybrid network including at least a broadcast network and a network supporting an Internet protocol is provided. To this end, a broadcast server constituting the broadcast system constructs control information to be used for acquiring an instruction table for driving the application contained in the hybrid multimedia service, and transmits the constructed control information to the user equipment in a predetermined format. The user equipment may acquire the instruction table using the control information provided from the broadcast server, and drive a desired application using the acquired instruction table.

16 Claims, 4 Drawing Sheets

(51) Int. Cl.
*H04N 21/63* (2011.01)
*H04N 21/6405* (2011.01)

(56) References Cited

U.S. PATENT DOCUMENTS

| | | | | |
|---|---|---|---|---|
| 2002/0199209 | A1* | 12/2002 | Shiga | H04H 60/04 725/136 |
| 2005/0155057 | A1* | 7/2005 | Wei | H04N 21/235 725/38 |
| 2005/0265699 | A1* | 12/2005 | Chiba et al. | 386/98 |
| 2008/0098429 | A1* | 4/2008 | Urabe et al. | 725/39 |
| 2009/0007174 | A1* | 1/2009 | Fukuda et al. | 725/39 |
| 2009/0264138 | A1 | 10/2009 | Kang et al. | |
| 2010/0083311 | A1* | 4/2010 | Vare | H04N 7/163 725/39 |
| 2010/0162339 | A1* | 6/2010 | Suh | H04N 21/4345 725/118 |
| 2011/0138281 | A1* | 6/2011 | Lai | H04L 67/2804 715/716 |
| 2011/0239263 | A1* | 9/2011 | Kim | H04N 21/4347 725/110 |
| 2013/0305305 | A1* | 11/2013 | Park | H04N 21/631 725/109 |
| 2014/0325544 | A1* | 10/2014 | Oh | H04N 21/478 725/14 |
| 2014/0380356 | A1* | 12/2014 | An | H04N 21/4722 725/32 |

FOREIGN PATENT DOCUMENTS

| | | |
|---|---|---|
| KR | 10-2007-0078238 A | 7/2007 |
| KR | 10-2009-0121435 A | 11/2009 |

* cited by examiner

APPARATUS AND METHOD FOR PROVIDING AN APPLICATION SERVICE IN A BROADCAST SYSTEM

CROSS-REFERENCE TO RELATED APPLICATION(S)

This application is a National Stage application under 35 U.S.C. §371 of an International application filed on Jan. 19, 2012 and assigned application PCT/KR2012/000512, and claims the benefit under 35 U.S.C. §365(b) of a Korean patent application filed on Jan. 19, 2011 in the Korean Intellectual Property Office and assigned Serial No. 10-2011-0005645, the entire disclosure of each of which is hereby incorporated by reference.

TECHNICAL FIELD

The present disclosure relates to an apparatus and method for providing an application service in a broadcast system. More particularly, the present disclosure relates to an apparatus and method for providing an application service in a broadcast system that provides a multimedia service based on a hybrid network.

BACKGROUND

A broadcast network of the related art generally uses a Moving Picture Experts Group-2 Transport Stream (MPEG-2 TS) for transmission of multimedia contents. That is, the MPEG-2 TS is used as a representative transmission technique for transmitting a bitstream in which a plurality of broadcast programs (a number of encoded video bit streams) are multiplexed in a homogeneous transmission environment. For example, the MPEG-2 TS is suitable for use in digital TV broadcasting of the multimedia era.

Figure 1:
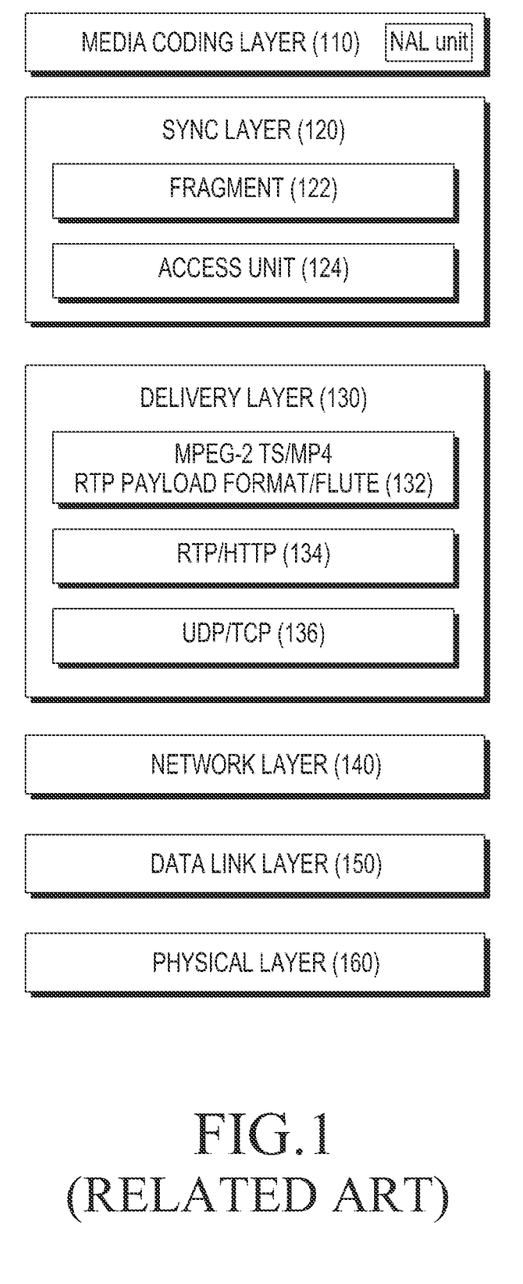
FIG. 1 illustrates a conventional hierarchical structure for supporting an Moving Picture Experts Group-2 Transport Stream (MPEG-2 TS) according to the related art.

FIG. 1 illustrates a hierarchical structure for supporting the MPEG-2 TS according to the related art.

Referring to FIG. 1, to support the MPEG-2 TS, there are a media coding layer (MEDIA CODING LAYER) 110, a synchronization layer (SYNC LAYER) 120, a delivery layer (DELIVERY LAYER) 130, a network layer (NETWORK LAYER) 140, data link layer (DATA LINK LAYER) 150, and a physical layer (PHYSICAL LAYER) 160.

The media coding layer (MEDIA CODING LAYER) 110 and the synchronization layer (SYNC LAYER) 120 are constructed in a format that facilitates use of media data as the basic unit of recording or transmission. The delivery layer (DELIVERY LAYER) 130, the network layer (NETWORK LAYER) 140, the data link layer (DATA LINK LAYER) 150, and the physical layer (PHYSICAL LAYER) 160 construct a multimedia frame for recording of a data block (for example, 'AU') in a format constructed by the synchronization layer (SYNC LAYER) 120 in a separate recording medium or for transmission of the data block. The constructed multimedia frame is transmitted to a subscriber terminal through a predetermined network.

To this end, the synchronization layer (SYNC LAYER) 120 is constructed by a fragmentation block (FRAGMENT BLOCK) 122 and an access unit (ACCESS UNIT) 124, and the delivery layer (DELIVERY LAYER) 130 is constructed by an MPEG-2 TS/MP4 132, an RTP/HTTP 134, and an UDP/TCP 136.

However, the MPEG-2 TS has several limitations in supporting multimedia services. For Example, the MPEG-2 TS only supports one-way communication. Moreover, transmission inefficiencies due to a fixed frame size, a transmission protocol specialized for audio/video, and unnecessary overhead in transmission using Internet Protocols (IPs) occur.

To address the limitations of the MPEG-2 TS, the MPEG MEDIA Transport (MMT) standard is newly suggested as a multimedia transmission technique for supporting multimedia services based on the MPEG technology. In particular, the MMT standard has been proposed by the MPEG to overcome the limitations of the MPEG-2TS.

Moreover, the MMT standard aims at defining a more friendly transmission technique for the IP that is a basic technique in a transmission network for the multimedia services. Hence, the MMT standard may be applied to efficiently transmit hybrid contents via a heterogeneous network.

The term hybrid contents refers to a set of contents in which multimedia elements corresponding to video/audio/application exist together, i.e., hybrid multimedia. The application includes an application that supports an additional service such as a widget service that may be additionally provided in a situation where a screen corresponding to particular content is provided in user equipment.

The heterogeneous network refers to a network where a broadcast network and a communication network coexist. The hybrid network may be a representative example of the heterogeneous network. For example, the hybrid network collectively refers to at least one broadcast network and at least one IP network which are used together for a hybrid multimedia service.

Considering the foregoing points, to support a hybrid multimedia service that provides an application associated with a real-time broadcast service composed of audio/video in a broadcast system, it may be desirable for the MMT standard to provide a definition of control information for associating a particular application with a real-time broadcast service and an application service by using the definition.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for providing an application service in a broadcast system that provides a multimedia service based on a hybrid network.

Another aspect of the present disclosure is to provide an apparatus and method for providing an application in a broadcast system that supports a hybrid multimedia service based on a hybrid network.

Yet another aspect of the present disclosure is to provide an apparatus and method for providing control information for providing an application to a user equipment in a broadcast system that supports a hybrid multimedia service based on a hybrid network.

Still another aspect of the present disclosure is to provide a user equipment and method for supporting an application corresponding to a hybrid multimedia service by using control information provided for the application from a broadcast server in a broadcast system that supports a hybrid multimedia service based on a hybrid network.

Another aspect of the present disclosure is to provide an apparatus and method for providing control information for supporting an additional service for a main service to a user equipment by using Program Specific Information (PSI) in a broadcast system that supports a hybrid multimedia service based on a hybrid network.

Still another aspect of the present disclosure is to provide an apparatus and method for providing information regarding commands for associating a secondary service with a main service to a user equipment in a broadcast system that supports a hybrid multimedia service based on a hybrid network.

In accordance with an aspect of the present disclosure, a method for driving an application, contained in a hybrid multimedia service, in a broadcast server that supports the hybrid multimedia service for a user equipment based on a hybrid network that includes at least a broadcast network and a network supporting an Internet protocol is provided. The method includes constructing control information to be used for acquiring an instruction table for driving the application included in the hybrid multimedia service and transmitting the constructed control information to the user equipment in a previously agreed format.

In accordance with another aspect of the present disclosure, an apparatus for driving an application, contained in a hybrid multimedia service, in a broadcast server that supports the hybrid multimedia service for a user equipment based on a hybrid network that includes at least a broadcast network and a network supporting an Internet protocol is provided. The apparatus includes a control unit configured to construct control information to be used for acquiring an instruction table for driving the application included in the hybrid multimedia service and a transmitter configured to transmit the constructed control information to the user equipment in a previously agreed format.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the description of the present disclosure, specific details will be provided to help in an overall understanding of the present disclosure. However, it will be obvious to those of ordinary skill in the art that the present disclosure may be carried out without the specific details.

For example, in an embodiment of the present disclosure described below, a hierarchical structure defined in the Moving Picture Experts Group (MPEG) MEDIA Transport (MMT) standard will be described. In addition, an embodiment of the present disclosure will provide a scheme for driving an application included in a hybrid multimedia service. In particular, detailed operations for acquiring a command for driving an application at a user equipment and driving the application by using the acquired command will be described.

In the present disclosure described below, for sake of convenience, a widget service will be used as an example of an application to be driven. For example, a situation may be assumed in which a widget service such as weather is provided as an additional service in association with a screen of a user equipment based on a real-time broadcast service corresponding to a main service.

However, it should be understood that an additional service of an application to which the present disclosure is applicable is not limited to a widget service. That is, it should be obvious that the present disclosure may be equally applied to any additional service of an application that may be associated with contents corresponding to the main service among applications that constitute a hybrid multimedia service as well as a widget service.

In the description of the present disclosure, well-known functions and structures which may unnecessarily obscure the subject matter of the present disclosure will not be described.

For example, an embodiment of the present disclosure will be focused on a structure of control information for acquiring, by a user equipment, an instruction table for driving an application, a structure of the instruction table, and an operation for providing the control information to the user equipment. It should be noted that an operation of providing, by a broadcast server, an application through a hybrid multimedia service and an operation for actually driving, by the user equipment, a desired application by using the acquired instruction table are regarded as irrelevant to the subject matter of the present disclosure and thus will not be described in detail.

Hereinafter, an embodiment of the present disclosure will be described in detail with reference to the accompanying drawings. Throughout the drawings, like components will be referred to as like reference numerals.

Figure 2:
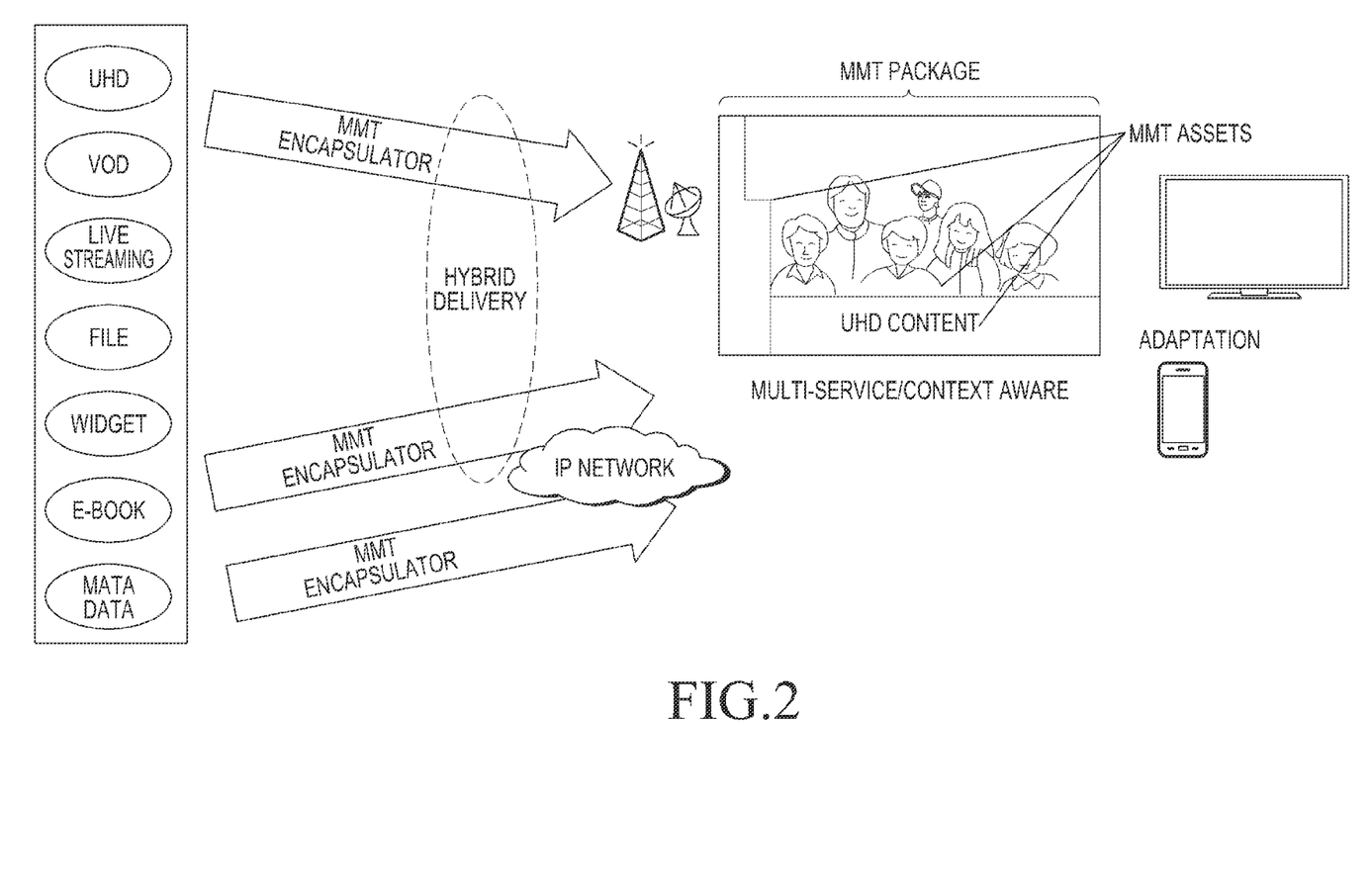
FIG. 2 conceptually illustrates an MPEG MEDIA Transport (MMT) service by a broadcast system based on the MMT standard according to an embodiment of the present disclosure.

FIG. 2 conceptually illustrates an MMT service by a broadcast system based on the MMT standard (hereinafter, referred to as an 'MMT system') according to an embodiment of the present disclosure.

Referring to FIG. 2, as contents for the MMT service, Ultra High Definition (UHD), Video On Demand (VOD), live streaming, files, widgets, E-books, metadata, and the like are assumed. However, any content and application that may be expressed in an electric signal may also be a target for a hybrid multimedia service. Moreover, control information and driving information for contents and applications corresponding to the hybrid multimedia service should also be provided together.

Multimedia data corresponding to each of various contents are encapsulated in a predetermined format by an MMT Encapsulator (ME) to construct a multimedia frame together with drive and control information, and the multimedia frame is transmitted to a subscriber terminal via a hybrid network.

The user equipment having received the multimedia frame via the hybrid network provides video/audio/application based on driving and control information. The user equipment is used to indicate a terminal that supports the hybrid multimedia service. Representative examples of the user equipment may include Internet Protocol (IP) TVs, smart phones, and so forth.

Therefore, goals achieved by the MMT service may be high-quality content delivery, hybrid content support, hybrid network support, and the like.

Figure 3:
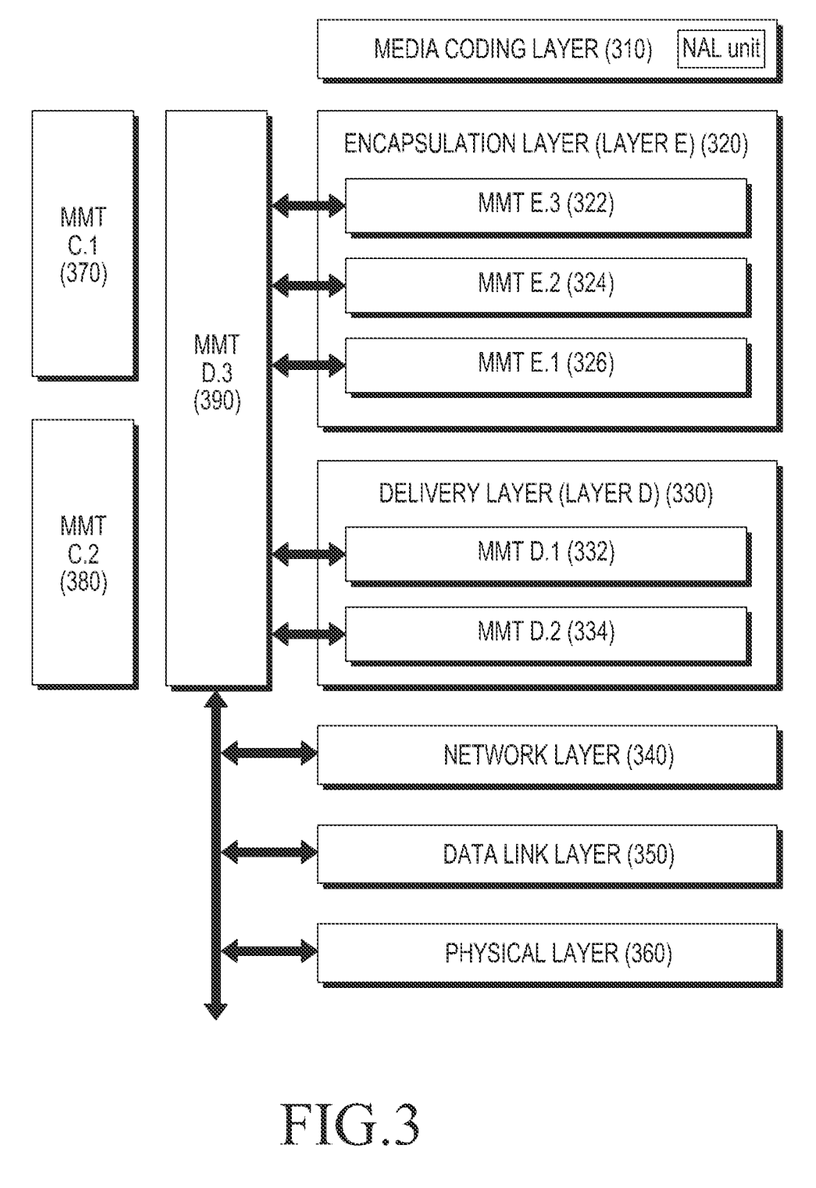
FIG. 3 illustrates a hierarchical structure for providing a hybrid multimedia service in an MMT system according to an embodiment of the present disclosure.

FIG. 3 illustrates a hierarchical structure for providing a hybrid multimedia service in an MMT system according to an embodiment of the present disclosure.

Referring to FIG. 3, seven layers are required for transmitting a constructed multimedia frame. The seven layers include a media coding layer (MEDIA CODING LAYER) 310, an encapsulation layer (ENCAPSULATION LAYER, hereinafter, referred to as a "Layer E") 320, a delivery layer (DELIVERY LAYER, hereinafter, referred to as a "Layer D" or a "Layer T") 330 or 390, a network layer (NETWORK LAYER) 340, a data link layer (DATA LINK LAYER) 350, a physical layer (PHYSICAL LAYER) 360, and a control layer (CONTROL LAYER, hereinafter, referred to as a "Layer C") 370 and 380.

According to an embodiment of the present disclosure, the Layer C 370 and 380 that constitute control information and an instruction table used to acquire an instruction table among the seven layers may be regarded as an 'information construction block'. The Layer D 330 that provides control information and the instruction table constituted by the Layer C 370 and 380 to the user equipment, the network layer (NETWORK LAYER) 340, the data link layer (DATA LINK LAYER) 350, and the physical layer (PHYSICAL LAYER) 360 may be regarded as 'information transmission blocks'.

Technology areas corresponding to three layers among the seven layers are important for the MMT standard. The three technology areas correspond to the Layer E 320, the Layer D 330 and 390, and the Layer C 370 and 380, respectively. The Layer E 320 plays a role of generating content corresponding to a hybrid multimedia service, the Layer D 330 and 390 plays a role of efficiently transmitting the generated content through a hybrid network, and the Layer C 370 and 380 plays a role for general control in consumption management and transmission management of the content corresponding to the hybrid multimedia service.

The Layer C 370 and 380 constructs the control information to be used for acquiring the instruction table for driving an application included in a hybrid multimedia service, and delivers the constructed control information to the Layer D 330. The Layer D 330 transmits the control information provided from the Layer C 370 and 380 to the user equipment.

In addition, the Layer C 370 and 380 constructs the instruction table for driving an application included in a hybrid multimedia service so as to be acquired by the constructed control information, and delivers the constructed instruction table to the Layer D 330. The Layer D 330 transmits the instruction table provided from the Layer C 370 and 380 to the user equipment.

Thereafter, by using the provided instruction table, the application is driven, and by doing so, an operation for providing the application to the user equipment may be performed.

Figure 4:
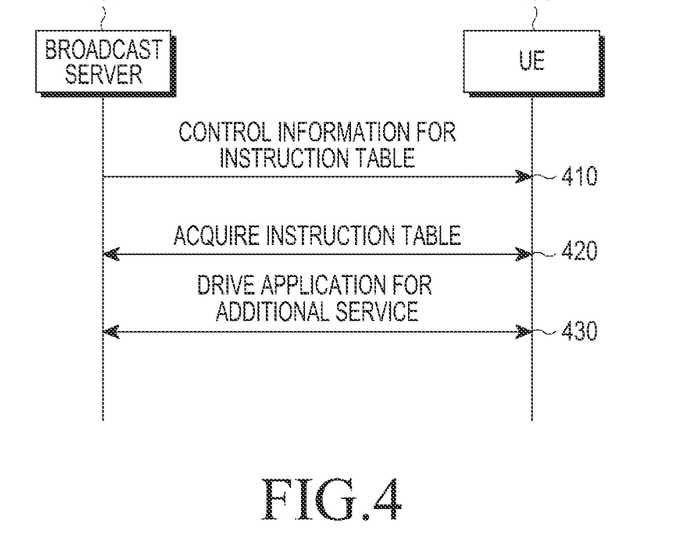
FIG. 4 schematically illustrates a procedure executed to drive an application in an MMT system according to an embodiment of the present disclosure.

FIG. 4 schematically illustrates a procedure executed to drive an application in an MMT system according to an embodiment of the present disclosure. That is, FIG. 4 illustrates a signal flow between a broadcast server and user equipment to drive an application.

Referring to FIG. 4, the broadcast server 401 constructs control information to be used for acquiring an instruction table and transmits the constructed control information to the user equipment 403 at operation 410. The user equipment 403 acquires the instruction table based on the control information received from the broadcast server 401 at operation 420.

Thereafter, the broadcast server 401 and the user equipment 403 drive the application for an additional service such as a widget function to be used in association with currently serviced content, by using the instruction table shared between them.

Figure 5:
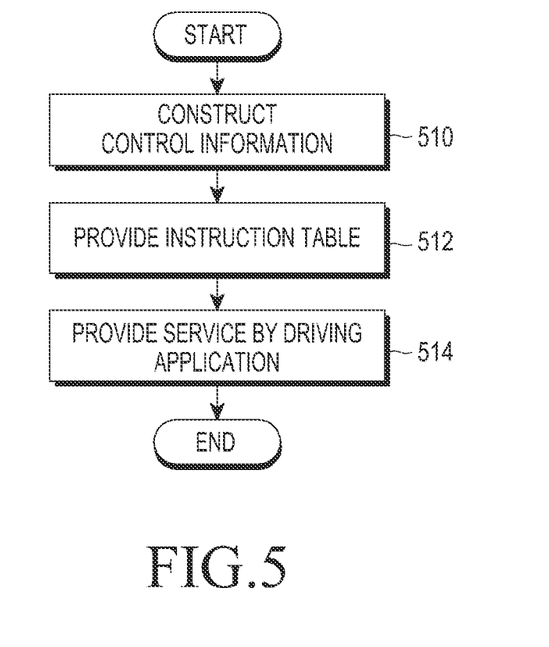
FIG. 5 illustrates a flowchart for driving an application based on an instruction table in an MMT system according to an embodiment of the present disclosure.

FIG. 5 illustrates a flowchart for driving an application based on an instruction table in an MMT system according to an embodiment of the present disclosure. That is, FIG. 5 illustrates an operation performed to drive an application included in a hybrid multimedia service in a broadcast server that supports the hybrid multimedia service for a user equipment based on a hybrid network. Herein, the hybrid network means a network that at least includes a broadcast network and a network that supports the Internet protocol.

The operation corresponding to the flowchart illustrated in FIG. 5 is performed by control layers, MMT C1 370 and MMT C2 280, among the layers illustrated in FIG. 3. In the following description, an entity for performing the operation of FIG. 5 will be referred to as a 'control layer'.

Referring to FIG. 5, the control layer constructs control information to be used for acquiring the instruction table at operation 510.

Table 1 shows an example of control information to be used for acquiring a Widget Command Table (WCT) for driving a widget service.

TABLE 1

| WIDGET COMMAND TABLE INFO | |
|---|---|
| TABLE ID | |
| WIDGET ID | |
| CONTENT ID | |
| PRIMARY INFO | LOCATION |
| | TIME |
| SECONDARY INFO | LOCATION |

Elements used in Table 1 may be defined as described below.

'TABLE ID' is an example of identification information indicating a table of control information for receiving an instruction table. That is, 'TABLE ID' is table identification information for identifying a table of control information for receiving the WCT.

'WIDGET ID' is application identification information indicating an application to be driven. That is, 'WIDGET ID' is widget identification information indicating a widget to be driven.

'CONTENT ID' is an example of identification information indicating content to be associated with the application indicated by the application identification information. That is, 'CONTENT ID' is content identification information indicating content to be associated with the widget indicated by WIDGET ID.

In addition, primary information (PRIMARY INFORMATION) and secondary information (SECONDARY INFORMATION) for acquiring the instruction table are defined.

'PRIMARY INFO' corresponding to the primary information is an example of information for acquiring the instruction table via the broadcast network that constitutes the hybrid network. That is, 'PRIMARY INFO' is primary information for acquiring the WCT for driving the widget indicated by WIDGET ID, and includes location information (LOCATION) and time information (TIME) for acquiring the WCT.

'SECONDARY INFO' corresponding to the secondary information is an example of information for acquiring the instruction table via the IP network that constitutes the hybrid network. That is, 'SECONDARY INFO' is secondary information for acquiring the WCT for driving the widget indicated by WIDGET ID, and includes location information (LOCATION) for acquiring the WCT.

'PRIMARY INFO' includes the time information (TIME), but 'SECONDARY INFO' does not include the time information, because networks used for them are different from each other. That is, as 'SECONDARY INFO' acquires the WCT via the IP network, the user equipment may request the server to provide the WCT by using the location information defined in 'SECONDARY INFO' regardless of time.

On the other hand, for the broadcast network, the WCT is provided at a designated time. Therefore, to acquire the WCT via the broadcast network, it is necessary to know information about the time at which the WCT is provided via the broadcast network. Hence, 'PRIMARY INFO' includes time information, unlike 'SECONDARY INFO'.

Meanwhile, as the location information (LOCATION) that constitutes 'PRIMARY INFO' and the location information (LOCATION) that constitutes 'SECONDARY INFO', a Uniform Resource Locator (URL) for acquiring the instruction table, for example, the WCT may be used.

The control layer transmits the constructed control information, for example, the control information to be used for acquiring the WCT shown in Table 1, to the user equipment in a previously agreed format. The previously agreed format may be a format of a table separately defined for providing Program Specific Information (PSI) corresponding to information about content. For example, the previously agreed format may be defined by one of a Program Association Table (PAT), a Program Mapping Table (PMT), a Network Information Table (NIT), and the like. In this case, 'TABLE ID' in the table having the format defined by Table 1 may not be used.

The control layer provides the instruction table to be acquired by the user equipment by using the control information transmitted to the user equipment at operation 512. The instruction table is provided via the hybrid network. The instruction table defines commands for driving the application included in the hybrid multimedia service, and defines the additional information necessary for using each of the commands.

For example, the instruction table includes application identification information indicating an application to be driven and information about commands that are available for driving the application indicated by the application identification information.

The instruction table may further include at least one of identification information for identifying the instruction table, version information of the instruction table, validity information regarding a period of validity of the instruction table, content identification information indicating content to be associated with the application indicated by the application identification information, information for updating the instruction table, and the like, when necessary. The information about the commands includes a command type, a resource to be used, and execution time for each command.

Table 2 shows an example of the instruction table.

TABLE 2

| WIDGET COMMAND TABLE | | | | | |
|---|---|---|---|---|---|
| ID | | | | | |
| VERSION | | | | | |
| VALIDITY | | | | | |
| WIDGET ID | | | | | |
| CONTENT (SERVICE) ID | | | | | |
| WIDGET COMMAND | COMMAND 1 | TYPE | START | | |
| | | | DO | | |
| | | | PRESENT | | |
| | | | REPLACE | | |
| | | | STOP | | |
| | | RESOURCE | INTERNAL | | |
| | | | EXTERNAL | ID | |
| | | | | | ADDRESS |
| | | EXECUTION TIME | | | |
| | COMMAND 2 | TYPE | START | | |
| | | | DO | | |
| | | | PRESENT | | |
| | | | REPLACE | | |
| | | | STOP | | |
| | | RESOURCE | INTERNAL | | |
| | | | EXTERNAL | ID | |

TABLE 2-continued

WIDGET COMMAND TABLE

| | | | | ADDRESS |
|---|---|---|---|---|
| | COMMAND 3 | EXECUTION TIME | | |
| | | TYPE | START | |
| | | | DO | |
| | | | PRESENT | |
| | | | REPLACE | |
| | | | STOP | |
| | | RESOURCE | INTERNAL | |
| | | | EXTERNAL | ID |
| | | | | ADDRESS |
| | | EXECUTION TIME | | |
| | COMMAND 4 | TYPE | START | |
| | | | DO | |
| | | | PRESENT | |
| | | | REPLACE | |
| | | | STOP | |
| | | RESOURCE | INTERNAL | |
| | | | EXTERNAL | ID |
| | | | | ADDRESS |
| | | EXECUTION TIME | | |
| | COMMAND 5 | TYPE | START | |
| | | | DO | |
| | | | PRESENT | |
| | | | REPLACE | |
| | | | STOP | |
| | | RESOURCE | INTERNAL | |
| | | | EXTERNAL | ID |
| | | | | ADDRESS |
| | | EXECUTION TIME | | |
| | COMMAND 6 | TYPE | START | |
| | | | DO | |
| | | | PRESENT | |
| | | | REPLACE | |
| | | | STOP | |
| | | RESOURCE | INTERNAL | |
| | | | EXTERNAL | ID |
| | | | | ADDRESS |
| | | EXECUTION TIME | | |
| WCT UPDATE INFO | TIME | | | |
| | LOCATION | | | |

In Table 2, 'ID' is identification information for identifying the WCT, and 'VERSION' is information indicating a version of the WCT. 'VALIDITY' is information regarding the validity period of the WCT, 'WIDGET ID' is identification information indicating the widget to which the WCT is to be applied, and 'CONTENT (SERVICE) ID' is identification information indicating content or a service to be associated with the widget indicated by 'WIDGET ID' according to data of the WCT.

'WIDGET COMMAND' defines each of commands available for driving the widget indicated by WIDGET ID. All of the commands for driving the widget or some of them may be transmitted, and the commands may be distinguished by execution time.

For example, Table 2 defines six commands in 'WIDGET COMMAND', and for each command, information such as 'TYPE', 'RESOURCE', and 'EXECUTION TIME' is defined.

'TYPE' indicates an operation of a corresponding command. To this end, 'TYPE' includes 'START', 'DO', 'PRESENT', 'REPLACE', and 'STOP'. 'START' means a start of the widget, 'DO' instructs the widget to perform a particular operation, and 'PRESENT' instructs the widget to display particular content. 'REPLACE' instructs the widget to replace a particular date with another date, and 'STOP' means a stop of the widget operation. In addition, according to characteristics of each widget, a command type may be added.

'RESOURCE' is information regarding a resource to be used for each command, and includes information about an internal resource (INTERNAL RESOURCE) and information about an external resource (EXTERNAL RESOURCE). The information about the internal resource (INTERNAL RESOURCE) is information about a resource that exists in the widget, and the information about the external resource (EXTERNAL RESOURCE) is information about a resource provided from outside for the widget. The information about the external resource (EXTERNAL RESOURCE) includes identification information (ID) and an address (ADDRESS).

'EXECUTION TIME' defines information about the time for executing a command and validity time, in which time is presented as absolute time or relative time.

Thus, based on Table 2, when the TYPE of a particular command is START, a corresponding widget is driven. The widget is first applied to content or a service to be associated at the time defined in EXECUTION TIME.

As a widget service in which the WCT is provided, additional information on a particular song, additional information on a particular singer, a user voting function, a user conversation function, and the like may be provided in a real-time music ranking program. The structure of the WCT may vary with the special characteristics of each widget. However, transmission of information for acquiring the instruction table through the PSI needs to be maintained.

'WCT UPDATE INFO' of Table 2 is information for previously providing information about time and a location at which the next WCT is to be transmitted to the user equipment. By providing the information about the next WCT, when a command for the widget is updated and the new WCT is transmitted, the user equipment may check data of the new WCT.

The control layer provides a service desired by the user equipment by driving an application based on the instruction table provided above at operation 514.

Table 3 provides an example of an operation for each of the six commands of Table 2. That is, an example in which TYPE corresponding to each command is set is shown.

TABLE 3

| COMMAND | TYPE | Operation |
| --- | --- | --- |
| COMMAND 1 | START | Instruct to drive a widget |
| COMMAND 2 | PRESENT | In a situation where a screen showing that a particular singer sings a song is output, instruct to additionally display information about the singer on the currently displayed screen according to a user input or a command of a service provider |
| COMMAND 3 | PRESENT | Instruct to display information about particular music on the screen |
| COMMAND 4 | DO | Instruct to execute a viewer-participating vote |
| COMMAND 5 | DO | Instruct to exchange opinions between viewers of music broadcasting through a chat |
| COMMAND 6 | STOP | Instruct to stop the operation of the widget |

In Table 3, for 'COMMAND 2' and 'COMMAND 3', if information about a singer or information about particular music is embedded in a widget, information indicated by INTERNAL RESOURCE is shown, and if the information exists outside the widget, information indicated by EXTERNAL RESOURCE is shown. Meanwhile, 'EXECUTION TIME' of 'COMMAND 2' and 'COMMAND 3' immediately operates when a user input is necessary, and otherwise, it operates at the time indicated by an operator.

In Table 3, to execute 'COMMAND 4', both the internal resource (INTERNAL RESOURCE) and the external resource (EXTERNAL RESOURCE) are used. In this case, the internal resource (INTERNAL RESOURCE) may be a voting phrase or a voting notification shown to a viewer. The external resource (EXTERNAL RESOURCE) may be an external program that provides a result of the vote to a service provider when the user votes. Meanwhile, 'EXECUTION TIME' of 'COMMAND 4' may be a time at which the user desires to participate in the vote or a time that is preset by the service provider.

In Table 3, in execution of 'COMMAND 5', a chat program may be associated with the external resource (EXTERNAL RESOURCE) to invite the user or the user may be instructed to use the chat program embedded in the widget by the internal resource (INTERNAL RESOURCE).

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for supporting a hybrid multimedia service for a user equipment based on a hybrid network that includes at least one of a broadcast network and an internet protocol (IP) network, the method comprising:
   constructing, by a broadcast server, control information for providing an application; and
   transmitting, by the broadcast server, the constructed control information to the user equipment in a predefined format,
   wherein the constructed control information comprises identification information indicating the application, primary information, and secondary information,
   wherein each of the primary information and the secondary information comprise location information for acquiring a table, and
   wherein the table comprises information corresponding to the identification information, the information comprising command information for providing the application.

2. The method of claim 1, wherein the primary information comprises the location information and time information for acquiring the table via the broadcast network, and the secondary information comprises the location information for acquiring the table via the IP network.

3. The method of claim 2, wherein the location information comprised in the primary information and the location information comprised in the secondary information are uniform resource locators (URLs).

4. The method of claim 1, wherein the constructed control information further comprises content identification information indicating a content to be associated with the application and table identification information identifying the table.

5. The method of claim 1, further comprising:
   providing the table via the hybrid network to the user equipment; and
   supporting driving of the application according to a command from the user equipment based on the table.

6. The method of claim 1, wherein the table further comprises at least one of identification information for identifying the table, version information of the table, validity information corresponding to a validity period of the table, content identification information indicating a content to be associated with the application, and information for updating the table.

7. The method of claim 6, wherein the command information comprises a command type, a resource to be used, and an execution time for each command.

8. The method of claim 1, wherein the predefined format is defined by a program association table, a program mapping table, or a network information table.

9. An apparatus for supporting a hybrid multimedia service for a user equipment based on a hybrid network that includes at least one of a broadcast network and an internet protocol (IP) network in a broadcast server, the apparatus comprising:
   a control unit configured to construct control information providing an application; and
   a transmitter configured to transmit the constructed control information to the user equipment in a predefined format,
   wherein the constructed control information comprises identification information indicating the application, primary information, and secondary information,
   wherein each of the primary information and the secondary information comprise location information for acquiring a table, and wherein the table comprises information corresponding to the identification information, the information comprising command information for providing the application.

10. The apparatus of claim 9, wherein the primary information comprises the location information and time information for acquiring the table via the broadcast network, and the secondary information comprises the location information for acquiring the table via the IP network.

11. The apparatus of claim 10, wherein the location information comprised in the primary information and the location information comprised in the secondary information are uniform resource locators (URLs).

12. The apparatus of claim 9, wherein the constructed control information further comprises content identification information indicating a content to be associated with the application and table identification information identifying the table.

13. The apparatus of claim 9, wherein the transmitter transmits the table via the hybrid network to the user equipment, and supports driving of the application according to a command from the user equipment based on the table.

14. The apparatus of claim 9, wherein the table further comprises at least one of identification information for identifying the table, version information of the table, validity information corresponding to a validity period of the table, content identification information indicating a content to be associated with the application, and information for updating the table.

15. The apparatus of claim 14, wherein the command information comprises a command type, a resource to be used, and an execution time for each command.

16. The apparatus of claim 9, wherein the predefined format is defined by a program association table, a program mapping table, or a network information table.

* * * * *